INVENTORS
WILLIAM F. CROFT
BENJAMIN C. SHAW
BY
Lyon & Lyon
ATTORNEYS

United States Patent Office 3,075,138
Patented Jan. 22, 1963

3,075,138
VOLTAGE REGULATOR
William F. Croft, Glendale, and Benjamin C. Shaw, Los Angeles, Calif., assignors to Crane Co., Chicago, Ill., a corporation of Illinois
Filed Jan. 19, 1959, Ser. No. 787,656
1 Claim. (Cl. 323—45)

This invention relates to voltage regulators and, more particularly, to improvements therein.

An object of this invention is to provide a voltage-regulator system requiring substantially no maintenance.

Another object of the present invention is to provide a new and useful voltage-regulator system.

Yet another object of the present invention is the provision of a voltage-regulator system which is efficient and does not require very much power for the operation thereof and can be conveniently packaged into a small size.

These and other objects of the present invention are achieved in an arrangement wherein power is supplied from a source over a line to a load. A transformer has its secondary winding inserted in series with the line. A primary winding of the transformer is center-tapped. The center tap is connected to one side of the secondary winding of the transformer. A variable impedance is connected between each end of the primary winding and the point of reference, or neutral potential for the system. Means are provided whereby a predetermined and desired voltage level is established. Any difference between the line voltage and this predetermined voltage level is detected and applied to the variable impedances in a manner to cause current flow in the primary winding in a direction to induce a voltage in the secondary winding in phase with, and therefore added to, the line voltage when the line voltage drops below the voltage established as a desired value. When the line voltage increases above the voltage established as a desired value, then the difference is detected and applied to the variable impedances in a manner to cause current flow in the primary winding in a direction to induce a voltage in the secondary winding which is out of phase with the line voltage and therefore serves to reduce the line voltage back to the desired predetermined level. The arrangement described may be employed for a single-phase or a multiple-phase voltage distribution system.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
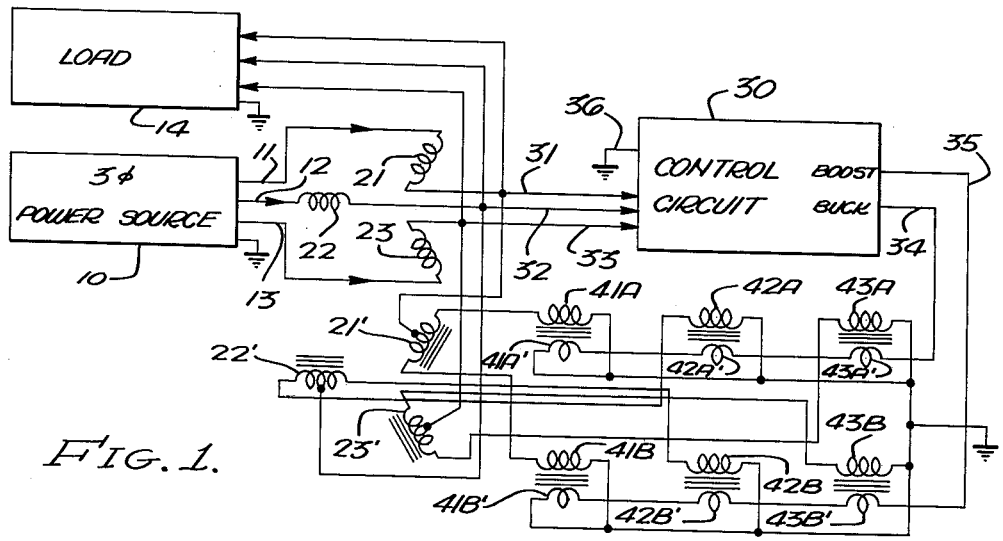
FIGURE 1 is a circuit diagram of an embodiment of the invention.

Reference is now made to FIGURE 1, which shows a circuit diagram of an embodiment of the invention. A three-phase power source 10 has three distribution lines 11, 12, 13. These three lines carry current to a load 14. In accordance with this invention, a three-phase transformer has three secondary windings 21, 22, 23 respectively connected to the lines 11, 12, and 13, and three center-tap primary windings 21', 22', and 23'. The center tap of the primary winding 21' is connected to one side of the secondary winding 21; the center tap of the primary winding 22' is connected to the one side of the secondary winding 22; and the center tap of the primary winding 23' is connected to one side of the secondary winding 23.

The sides of the secondary windings to which the primary winding center taps are connected are respectively connected over lines 31, 32, 33 to the control circuit 30.

Ground, or neutral, for the system is also connected to the control circuit 30 over the line 36. A variable impedance is provided to connect each end of the primary windings to the ground, or neutral potential point. A preferred variable impedance is provided by a saturable reactor. Thus, the primary winding 21' will have a saturable reactor 41A connected between one of its ends and ground. Associated with the saturable reactor 41A is its control winding 41A'. The other end of the primary winding 21' is connected to ground through a saturable reactor 41B, which has a control winding 41B'. Primary winding 22' has one end connected to ground through a saturable reactor 42A having a control winding 42A'. The other end of the primary winding 22' is connected to ground through a saturable reactor 42B having a control winding 42B'. Primary winding 23' has one end connected to ground through a saturable reactor 23A and a control winding associated therewith 43A'. The other end of the primary winding 23' is connected to ground through a saturable reactor 43B, having a control winding associated therewith 43B'. It will be noted that control windings 41A', 42A', and 43A' are all connected in series and one end of the series connection is returned to ground and the other end of the series connection is connected to the control circuit 30 over a line 34. The control windings 41B', 42B', 43B' are similarly connected in series with one end being connected to ground and the other end connected to the control circuit 30 over a line 35.

The operation of the embodiment of the invention shown may be briefly described as follows. The control circuit 30 detects the difference between a predetermined reference voltage which it is desired to be maintained and the actual voltage of the line which is sampled over the lines 31, 32, and 33. When the line voltages and the predetermined voltages are substantially identical, then no current flows over lines 34 and 35 to the respective control windings. Very little current flows from the center tap of the primary through either saturable reactor to the neutral point, so that no voltage is induced in the secondary, and there is no effect on the line voltage. However, when the line voltage increases over the predetermined voltage level, then current is applied over the line 34 to cause the control windings 41A', 42A', and 43A' to reduce the impedance of the saturable reactors 41A, 42A, and 43A. This has the effect of drawing a current through the half of the primary which induces voltage in the secondary which is out of phase with the line voltage and, therefore, opposes it, or bucks it, and thereby the line voltage is lowered. Of course, the current which flows through the control windings 41A', 42A', 43A' depends upon the amount the saturable reactor's reactance must be lowered to enable the bucking voltage to reduce the line voltage to the desired value.

When the line voltage drops below the predetermined desired value, then the control circuit operates to detect this difference and cause a current to flow in the line 35. This current flowing through the control windings 41B', 42B', 43B' reduces the impedance of the saturable reactors 41B, 42B, and 43B, whereby current is drawn from the center tap through that half of the primary winding which induces a voltage in the secondary which is in phase with the line voltage, and thereby the line voltage is raised. This voltage is raised until the predetermined desired level of voltage is attained, whereupon the saturable reactor impedances will be restored to the value required to nullify the boosting voltage being applied from the secondaries of the transformer. Effectively, therefore, the operation of the bucking reactors 41A, 42A, and 43A and of the boosting reactors 41B, 42B, 43B is to provide a dynamic voltage-divider action whereby the voltage across the secondary winding is added or subtracted from the line voltage to maintain the predetermined voltage level.

Figure 2:
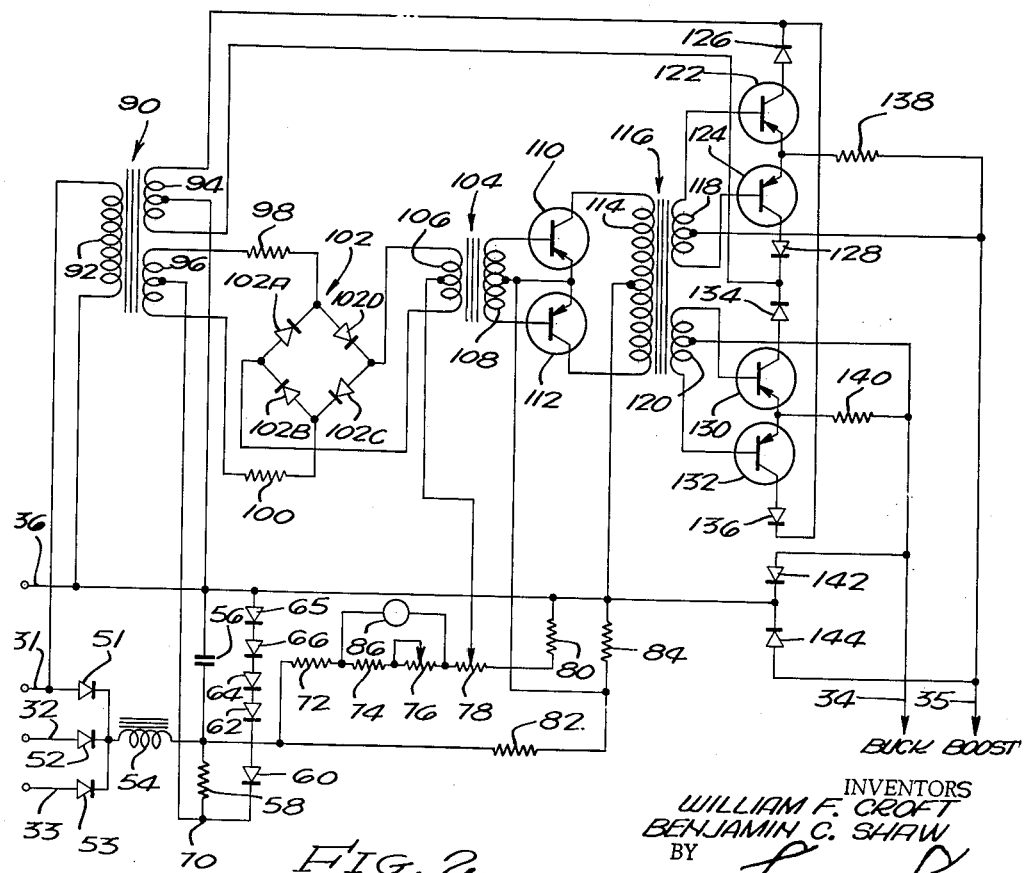
FIGURE 2 is a circuit diagram of the control circuit employed in the embodiment of the invention.

Reference is now made to FIGURE 2 of the drawings, which shows the details of the control circuit 30. The connections between FIGURE 1 and FIGURE 2 by means of the lines 31 through 36 bear the identical reference numerals on both figures of the drawings and therefore should be clear. Rectifiers 51, 52, 53 are connected to the lines 31, 32, and 33 in order to rectify the alternating current. The three rectifiers are brought to a common junction to which is connected an inductance 54. A filter capacitor 56, together with the inductance 54, further serves to smooth the rectified alternating current to render it substantially direct current. Across this line there is then connected a resistor 58 and a Zener diode, or a series spring of Zener diodes 60, 62, 64, 66, and 68. The Zener diode or diodes, together with resistor 58, co-operate to provide a reference potential at point 70. This point is a junction between the resistors and the Zener diodes. This desired reference potential may be established by the type of Zener diode or diodes selected.

The Zener diode used what is known as the avalanche effect, whereby when the value of the back current applied through a Zener diode exceeds a predetermined value, a certain voltage will appear across the Zener diode, the value of which will not vary despite variations in the current through the Zener diode above the current which creates the avalanche effect. Thus, the voltage drop across Zener diodes 60, 62, 64, 65, 66 is constant, and the voltage at point 70 is established as a desired reference value with respect to ground.

The inductance 54 is also connected to a voltage divider including resistors 72, 74, potentiometer 76, potentiometer 78, and resistor 80. A second voltage divider is provided which is also connected across the line. This second voltage divider includes a resistor 82 in series with a resistor 84. A thermistor element 86 is connected across resistor 74 and potentiometer 76. The thermistor element has a negative temperature coefficient, whereby when the temperature increases the resistance of the thermistor decreases, and when the temperature decreases its resistance increases. Thus, compensation may be made for temperature variations which might otherwise affect adversely the voltage-regulating action. In view of the shunt connection of the thermistor, the resistance of the voltage divider is altered to compensate for variations in voltage. The potentiometer 76 is said to provide a central position about which correction for temperature variations is desired. Potentiometer 78 enables the selection of the line-sampling voltage.

A transformer 90 has its primary winding 92 connected between the lines 31 and 36 to derive power for the system. The transformer 90 has two secondary windings 94, 96. Both of these windings are center-tapped, the center tap of the secondary winding 94 being connected to ground over the line 36; the center tap of the secondary winding 96 being connected to the reference voltage point 70. The ends of the windings 96 are connected through current-limiting resistors 98, 100 to a ring-modulator or diode bridge 102. This consists of four diodes 102A, 102B, 102C, 102D, which are connected together in typical ring fashion. Two of the ring junctions are connected to receive the voltage from the secondary winding 96; the opposite two ring junctions are connected to deliver voltage to the primary winding 106 of a transformer 104. The center tap of the winding 106 is connected to the potentiometer 78 to receive the sampled line voltage.

As long as the reference voltage at point 70 is equal to the line voltage derived from potentiometer 78, no A.C. current will flow from the ring modulator, since conduction through the diodes is equal. Should the voltage derived from potentiometer 78 deviate from the established reference voltage, then current can flow through the ring modulator in a phase determined by the direction of the deviation from the reference voltage. The amplitude of this current is also determined by the amplitude of the deviation. Thus, an alternating current will excite the winding 106 and a voltage will be induced in the secondary winding 108. The ends of the secondary winding 108 are connected to the bases of two transistors 110, 112. A bias voltage is applied to the emitters of the two transistors from the voltage divider, consisting of resistors 82 and 84 in series. The collectors of the transistors 110, 112 are connected to the primary winding 114 of a third transformer 116. The primary winding 114 is center tapped and connected to ground. Transformer 116 also has two center-tapped secondary windings 118 and 120.

As has been described thus far, any unbalance between the voltages selected from potentiometer 78 and that from the reference potential point 70 results in an alternating current having the phase and amplitude representative of the amplitude and polarity of the unbalance. This alternating current appears on the secondary winding 108 of transformer 104 and is amplified by the transistors 110, 112, which are biased to provide overdriven voltage amplifier operation. This amplifier output therefore consists of essentially square waves. These are applied to the transformer 116 and appear on the secondary windings 118, 120. The ends of the winding 118 are connected to the bases of two transistors 122, 124. The secondary winding 94 provides current for the collectors of these transistors, which is rectified through the diodes 126, 128. Similarly, the ends of the secondary windings 120 are connected to the bases of transistors 130, 132. Collector potential for these transistors is derived from the winding 94 through rectifiers 134, 136. Output from transistors 122, 124 is derived from their emitters, which are connected to a resistor 138, which in turn is connected to the line 35. Output from transistors 130, 132 is derived from their emitters, which are connected to a resistor 140, which in turn is connected to the line 34. Diodes 142, 144, which are connected between respectively lines 34 and 35 and ground, serve the purpose of bypassing any voltage surges which may occur and thus can prevent damage which such voltage surges can cause.

The transistors 122—124, and 130—132 are connected to form synchronous demodulators, whereby full-wave rectification of any alternating current voltage which may be received from the transformer 116 is provided. One or the other pair of the transistors 122—124, 130—132 may conduct, depending upon the phase of the voltage which is received from the transformer 116. The pair that conducts is the pair to which the applied collector voltage and base voltage are in phase. The amplitude of the voltage which is provided at lines 34, 35 depends upon the amplitude of the deviation of the signal. The one of the two lines which receives the output of the transistors is determined by the direction of such deviation, which in turn determines the phase of the alternating current which is amplified by transistors 110 and 112, which in the final chain of the sequence determines which one of the pairs of the transistors 122—124, 130—132 will conduct. As previously pointed out, when a given pair of transistors conducts, the output is similar to a full-wave rectification waveform. At that time, the other pair of transistors will not conduct.

There has accordingly been described and shown a novel, useful, and simple voltage regulator arrangement. This arrangement, although described for a three-phase system, may readily be employed for the single-phase system as well. It will be appreciated that the system is a completely solid state one, no parts being present which are subject to wear and which need replacement. Once the system is installed and adjusted to provide satisfactory voltage regulation, on further maintenance need be given to it.

We claim:

A voltage regulator for a three-phase system of the type having three lines over which current is supplied to a load over a line, said regulator comprising for each line a transformer having a secondary winding connected into said line and a center-tapped primary winding, a connection between said center-tapped primary winding and one side of said secondary winding, a neutral potential point for said system, a first saturable reactor connected between one end of said primary winding and said neutral potential point, a second saturable reactor connected between the other end of said primary winding and said neutral potential point, means responsive to the voltage on said line varying from a predetermined value for varying the impedance of said first and second saturable reactors to thereby enable the voltage on said primary winding to compensate for said voltage regulations including means to establish said predetermined voltage value, a ring modulator, means to apply said line voltage and said predetermined voltage value to said ring modulator to derive any difference voltage, means to demodulate said difference voltage, a control winding for each one of said saturable reactors, and means to apply the output of said means to demodulate to all of said control windings to vary the reactance of all said first saturable reactors oppositely to the reactance of all said second saturable reactors.

References Cited in the file of this patent
UNITED STATES PATENTS

| | | |
|---|---|---|
| 1,701,379 | Lennox | Feb. 5, 1926 |
| 1,654,948 | Thompson | Jan. 3, 1928 |
| 2,377,152 | Huge | May 29, 1945 |
| 2,436,788 | Bricout | May 2, 1948 |
| 2,650,341 | Jones | Aug. 25, 1953 |
| 2,651,020 | Milson | Sept. 1, 1953 |